United States Patent
Kapadia et al.

(10) Patent No.: US 10,042,506 B2
(45) Date of Patent: Aug. 7, 2018

(54) INTERACTIVE STORY DEVELOPMENT SYSTEM AND METHOD FOR CREATING A NARRATIVE OF A STORYLINE

(71) Applicant: Disney Enterprises, Inc., Burbank, CA (US)

(72) Inventors: Mubbasir Kapadia, Baden (CH); Robert Sumner, Zurich (CH); Alexander Shoulson, Philadelphia, PA (US)

(73) Assignee: Disney Enterprises, Inc., Burbank, CA (US)

(*) Notice: Subject to any disclaimer, the term of this patent is extended or adjusted under 35 U.S.C. 154(b) by 444 days.

(21) Appl. No.: 14/663,121

(22) Filed: Mar. 19, 2015

(65) Prior Publication Data
US 2016/0274705 A1    Sep. 22, 2016

(51) Int. Cl.
G06F 3/048       (2013.01)
A63F 13/60       (2014.01)
A63F 13/47       (2014.01)

(52) U.S. Cl.
CPC .............. *G06F 3/048* (2013.01); *A63F 13/47* (2014.09); *A63F 13/60* (2014.09)

(58) Field of Classification Search
CPC ...................................................... A63F 13/47
See application file for complete search history.

(56) References Cited

U.S. PATENT DOCUMENTS

| | | | |
|---|---|---|---|
| 7,890,534 B2 | 2/2011 | Bathiche | |
| 8,177,639 B2 | 5/2012 | Schell | |
| 8,566,348 B2 | 10/2013 | Rinearson | |
| 2006/0040748 A1* | 2/2006 | Barthold | A63F 13/02 463/43 |
| 2007/0099684 A1* | 5/2007 | Butterworth | G11B 27/034 463/1 |
| 2010/0092930 A1* | 4/2010 | Fletcher | G09B 5/062 434/178 |
| 2011/0070936 A1* | 3/2011 | Barthold | A63F 13/02 463/1 |
| 2012/0157197 A1 | 6/2012 | Watkins | |

(Continued)

OTHER PUBLICATIONS

Fred Charles, "Character-driven Story Generation in Interactive Storytelling", Oct. 2011, pp. 1-7.

(Continued)

*Primary Examiner* — Jay Liddle
(74) *Attorney, Agent, or Firm* — Farjami & Farjami LLP

(57) ABSTRACT

There is provided a method for use by an interactive story development system. The method includes receiving a story state including an attribute state of each of a plurality of items present in a storyline, wherein the plurality of items include a plurality of objects of the storyline and a plurality of characters of the storyline. The method also includes creating a story web, wherein the story web includes a node for every possible interaction between the plurality of objects and the plurality of characters in the storyline, and calculating a narrative value for each of the nodes of the story web, receiving a first input from a user selecting user criteria including at least one of a story telling option of the storyline and a sentiment selection, and determining based on the narrative value and the user criteria, a plurality of candidate nodes of the story web.

14 Claims, 7 Drawing Sheets

(56) References Cited

U.S. PATENT DOCUMENTS

| | | | |
|---|---|---|---|
| 2012/0190446 A1* | 7/2012 | Rogers | G06Q 10/00 463/31 |
| 2012/0190456 A1* | 7/2012 | Rogers | G06Q 10/00 463/42 |
| 2014/0019865 A1 | 1/2014 | Shah | |
| 2014/0032471 A1 | 1/2014 | Reddy | |
| 2014/0080109 A1 | 3/2014 | Haseltine | |
| 2014/0141889 A1 | 5/2014 | Chowdhary | |
| 2014/0180994 A1 | 6/2014 | Llobera | |
| 2015/0079573 A1* | 3/2015 | Haseltine | G06F 17/30398 434/319 |

OTHER PUBLICATIONS

Jeffrey David Orkin, "Collective Artificial Intelligence: Simulated Role-Playing from Crowdsourced Data" 2013, pp. 1-184.
Mark O. Riedl, "Believable Agents and Intelligent Story Adaptation for Interactive Storytelling", 2006, pp. 1-12.
Marc Cavezza, "Towards Empathic Neurofeedback for Interactive Storytelling", 2014, pp. 42-60 (19).

* cited by examiner

INTERACTIVE STORY DEVELOPMENT SYSTEM AND METHOD FOR CREATING A NARRATIVE OF A STORYLINE

BACKGROUND

Conventional video games have a predetermined narrative, and that narrative controls a user's experience within the game. The player makes decisions about particular events, such as whether to enter a door, or whether to engage another character in a fight, etc. However, the user does not influence or determine the narrative of the game. Contemporary video games, sometimes called sandbox games, allow a user to travel within the world of the game freely and to interact with other characters and objects in the game. Although the user has some freedom to determine where to go and what to do in the sandbox game, sandbox games do not have long-term goals found in a conventional video game, and generally do not have a narrative.

SUMMARY

There is provided an interactive story development system and method for creating a narrative of a storyline, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detained description are directed to merely exemplary implementations. Unless noted otherwise, like of corresponding elements among the figures may be indicated by like or corresponding references numerals. Moreover, the drawings and illustrations in the present application are generally not to scale, and are not intended to correspond to actual relative dimensions.

Figure 1:
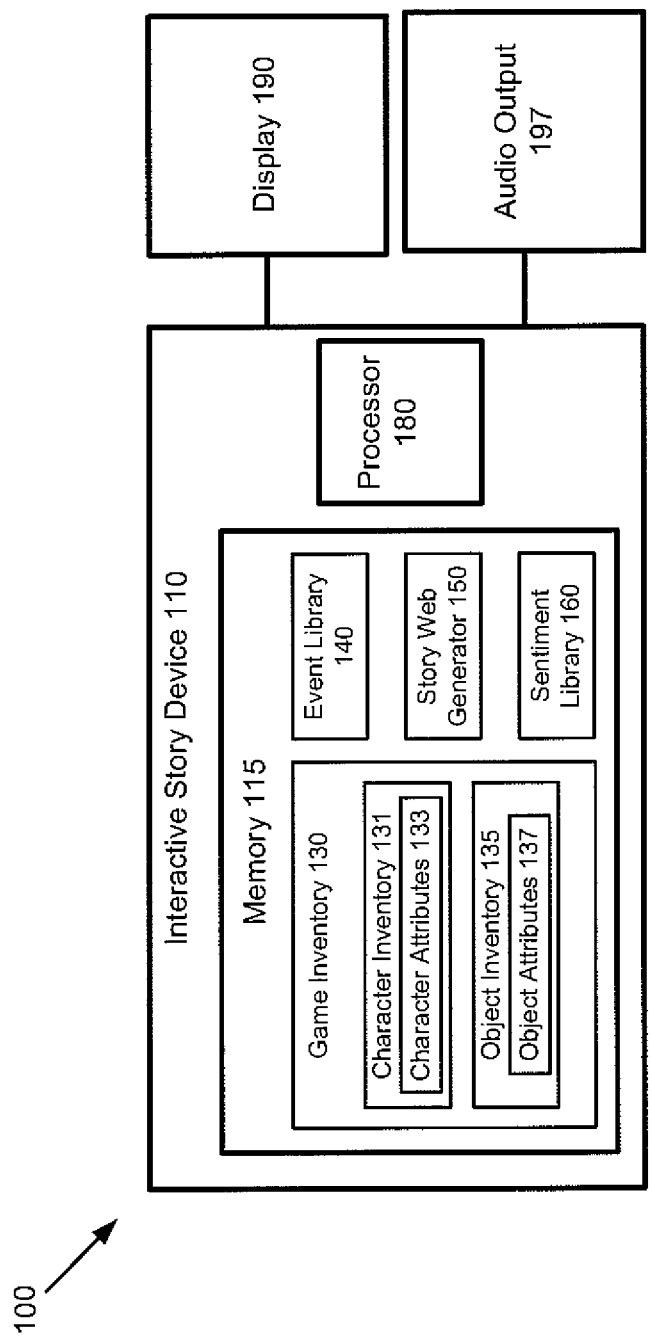
FIG. 1 shows a diagram of an exemplary interactive storyline development system, according to one implementation of the present disclosure.

FIG. 1 shows a diagram of an exemplary interactive storyline development system 100, according to one implementation of the present disclosure. As shown in FIG. 1, interactive storyline development system 100 includes interactive story device 110, including memory 115, processor 180. Interactive storyline development system 100 may also include display 190 and audio output device 197.

Memory 115 is a non-transitory medium for storing data, and may be a non-volatile memory. Memory 115 may include story inventory 130, event library 140, story web generator 150, sentiment library 160. Story inventory 130 may include character inventory 131, and object inventory 135.

Interactive story device 110 may include an interactive video game with a story having a plurality of objects in the story and a plurality of characters in the story. In some implementations of interactive story device 110, various combinations of the plurality of objects and the plurality of characters may be included in a storyline. To accommodate all possible iterations of objects and characters, memory 115 may include story inventory 130, which in turn may contain character inventory 131 and object inventory 135. Character inventory 131 may include each character of the plurality of characters that may be in a storyline created by the user using interactive storyline development system 100. Character inventory 131 may include character attributes 133, where character attributes 133 describe a state of attributes corresponding to each character of the plurality of characters in character inventory 131. The state of attributes associated with a character may describe a character state of each character. Object inventory 135 may include each object of the plurality of objects that may be in a storyline. Object inventory 135 may include object attributes 137, where object attributes 137 describe a state of attributes corresponding to each object of the plurality of objects that may be in a storyline. The state of attributes associated with an object may describe an object state of each object.

Character attributes 133 and object attributes 137 may be updateable. Character attributes 133 may change when a character in a storyline interacts with another item in the storyline, and object attributes 137 may change when an object interacts with another item in the storyline. Character attributes 133 and object attributes 137 may include embedded information about how character may use an object. A combination of the object state and character state of each object in a story and each character in a story at any time may describe a story state of the story.

In addition to story inventory 130, memory 115 may include event library 140. Event library 140 may describe the change in character attributes 133 of each character in character inventory 131 when the character interacts with an object or another character in a storyline. Event library 140 may also describe the change in object attributes 137 of each object in object inventory 135 when the object interacts with a character or another object in a storyline. For example, in a story including only a person, an axe, and a tree, event library 140 would describe the change in attributes when the person and axe interact, the change in attributes when the axe and tree interact, and the change in attributes when the person and tree interact.

Story web generator 150 may create a story web including each possible interaction between objects and characters in a story. Story web generator 150 may use character inventory 131 and object inventory 135 in combination with event library 140 to create the story web.

Memory 115 may also include sentiment library 160. Sentiment library 160 may include a plurality of sentiments, where a sentiment is an overarching characteristic of a storyline or a segment of a storyline. Sentiment library 160 may include sentiments such as violent, non-violent, brave, negligent, and other sentiments. Sentiment library 160 may be used to select a sentiment that applies to an entire storyline, and sentiment library 160 may be used to select a sentiment that applies to a portion of a storyline. Sentiment library 160 may be accessed throughout a storyline to change the sentiment of a storyline any number of times during the storyline, so that different segments correspond with different sentiments.

Figure 2:
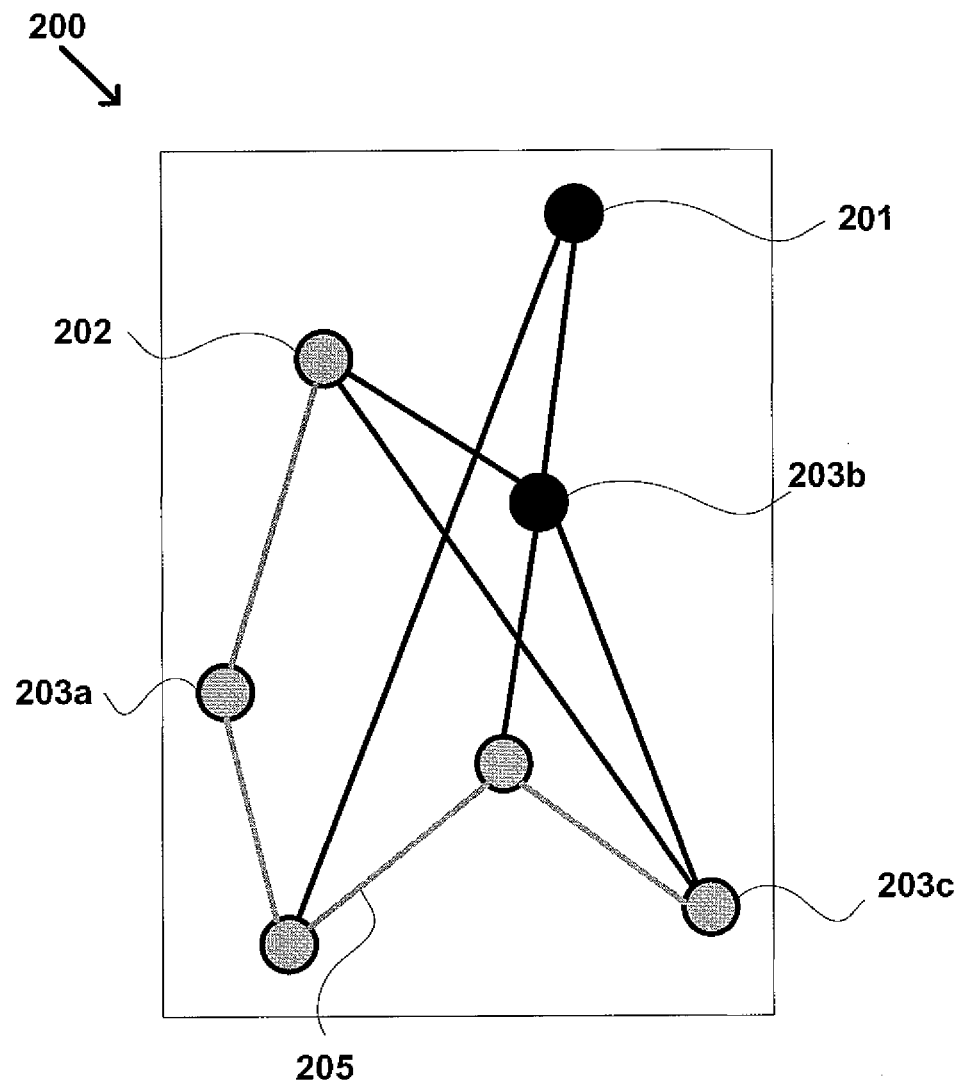
FIG. 2 shows an exemplary diagram of a story web for a developing storyline, according to one implementation of the present disclosure.

FIG. 2 shows an exemplary diagram of a story web for a developing storyline, according to one implementation of the present disclosure. According to an implementation, the term story may refer to all possible interactions between or among items in story inventory 130, and the term storyline may refer to a continuous set of transitions connecting an initial story state with subsequent story states within a story. These interactions and connections between interactions can be construed as story web 200, with each interaction being a node and the transitions between story states being lines. Storyline 205 may be a continuous series of line segments connecting nodes of story web 200.

Story web 200 may include a plurality of nodes, where a node is an intersection of storylines indicating an interaction between or among characters and objects in the story. Node 201 indicates a node that may be the beginning of storyline 205 and correspond to a story state describing the character attributes 133 of each character in the story, and the object attributes 137 of each object in the story at node 201. Based on the character attributes 133 and object attributes 137 associated with node 201, in combination with event library 140, certain nodes of a story may be connected by a segment of a storyline, as depicted by each connecting line in FIG. 2. For example, node 201 includes characters having character attributes 133 and objects having object attributes 137 that can interact in a number of ways. According to story web 200, node 201 includes a set of attributes that can lead to nodes 202a, 202b, and 202c. Story web 200 may be used to create storyline 205, which corresponds to the segments having initial conditions at node 201, and then progressing through nodes 202a, 203, 204, and ending at node 202c. It should be noted that terminal node 202c may not correspond to the end of the storyline, but may be the node corresponding to the current state of the story.

Story web 200 may be generated by story web generator 150. In an implementation, Story Web 200 may be created in several phases. First, the virtual world serving as the setting of the story may be serialized and exported into a series of descriptive headers. These headers may contain all of the story-relevant items in story inventory 130 with their initial object state or character state, relationships towards one another as described in event library 140. The events are also tagged with one or more descriptive sentiments that align the event with a particular mood or theme such as "Brave" or "Non-violent". This world serialization may be loaded into story web generator 150 to produce story web 200. Once story web generator 150 receives the serialization, story web generator 150 performs a complete graph exploration of the graph B. For each node N in the graph, and for each event e in event library 140, story web generator 150 may evaluate all possible event instances I= $\langle e; w \in W^{|re|}_N \rangle$ across all possible participant populations such that $\varphi_e(w)$=TRUE. For each such instance I, story web generator 150 may create a new node and corresponding story state N', $s_{WN'}$ expressing the state created by modifying N by the post conditions e of the event e. A new transition line A may be created linking N and $N_0$ with the event instance I that precipitated their transition. The creation of story web 200 terminates when all unique story state configurations have been found and any further event executions result in produced world states that have already been bound to nodes in story web 200.

Algorithm 1, shown below, is an algorithm for exhaustively sampling states for complete coverage of the story space. This approach is practical for reasonably sized story worlds where the cardinality of the state space is $\sim 10^3$. For much larger story worlds with tens, even hundreds of characters, and numerous possible events, we can use coverage-guided sampling approaches that can focus the sampling of states in the story space to maximize coverage.

---

Algorithm 1: Story web pre-computation algorithm

Data: an initial world configuration $W_0$
Data: a library of events E
Result: a story web B = $\langle N, A \rangle$
O ← $\{W_0\}$;
C ← $\{W_0\}$;
N ← $\{W_0\}$;
A ← $\{\}$;
while $|O| > 0$ do
    n ← pop(O);
    foreach e ∈ E do
        foreach $w \in W_n^{|re|}$ do
            if $\varnothing_e(w)$ = TRUE then
                n ' ← transform(n, e);
            if n ' $\notin$ C then
                O ← O $\cup$ n ';
                C ← C $\cup$ n ';
                N ← N $\cup$ n ';
                A ← A $\cup$ (n, $\langle e; w \rangle$, n ');
return B = $\langle N, A \rangle$;

---

After completing story web 200, including connectivity information between nodes, where each node may represent a story state, interactive storyline development system 100 may pre-compute features and meta-data for use in storyline selection. The first analysis performed on story web 200 may be a pre-computation of all of the shortest paths between nodes. The all-pairs shortest path calculation may be performed using a floodfill algorithm that may be massively parallelized and ported onto the GPU. This may reduce the overhead of recomputation from days to a matter of minutes.

In addition to storing the shortest path between each node (and associated properties such as path length), interactive storyline development system 100 may calculate additional low-level features that characterize the topology of story web 200. Such low-level features may include pagerank, inverse pagerank, min-cut, avg. min-cut in, avg. min-cut out, as described below. These features may be computed and serialized alongside story web 200 for use in real-time story exploration.

Pagerank may be a heuristic associated with each individual node. Pagerank may be used to estimate, for each node, how likely a node is to be selected in a random exploration of story web 200. Interactive storyline development system 100 may use pagerank to estimate a node's "popularity," in terms of how much traffic can be directed to it in story web 200.

Inverse pagerank may be a heuristic associated with each individual node. Inverse pagerank may be used to give an estimate of redundant or unnecessary nodes. That is, a node with a high inverse pagerank score may be unlikely to be accessed, while also leading to many other nodes in story web 200. Interactive storyline development system 100 may use this heuristic to identify "low-value" nodes that add little to the story beyond simply being another step in its trajectory.

Min-cut may be a heuristic associated with each node pair that is connected by a transition line. Min-cut may be used to measure the minimum number of transition lines that must be removed from story web 200, in order to sever all paths from the first node to the second. Min-cut may give a measure of the robustness of story web's 200 connectivity. Min-cut may be used to identify bottlenecks in story web 200. When two clusters of nodes are connected by a small bottleneck of one or two transition lines, then the events of those transition lines may represent critical "climax" points of the story that drastically change the story along interesting points of no return.

Avg. min-cut in may be a heuristic associated with each individual node. Avg. min-cut in may measure the average connective strength of other nodes in reaching a particular node. Nodes with high avg. min-cut in may be very easy to reach and may represent commonly reused story elements.

Avg. min-cut out may be a heuristic associated with each individual node. Avg. min-cut out may measure the average connective strength of a node in reaching other nodes. Nodes with high avg. min-cut out represent hubs of "story clusters", and may originate multiple diverse story trajectories.

Interactive story development system 100 may calculate a narrative value for each node in story web 200. Calculation of the narrative value may include pagerank, inverse pagerank, min-cut, avg. min-cut in, and avg. min-cut out. Calculation of narrative value of a node may include a quantitative component, a qualitative component, or both a quantitative and a qualitative component, as discussed further below.

Calculation of a narrative value may include a starting node, an ending node and a. storyline connecting the starting node to the ending node. Given an initial story state s, and end story state e, and path Π(s; e), interactive story development system 100 may compute cost(s; e; p(s; e)). Note that Π(s; e) consists of a list of tuples Π(s; e)=((s; $v_1$; $n_1$); ($n_1$; $v_2$; $n_2$); : : : ; ($n_{k-1}$; $v_k$; $n_k$); ($n_k$; $v_{k+1}$; e)) where each triple ($n_i$; $v_{i+1}$; $n_{i+1}$) consists of a first node $n_i$, a second node $n_{i+1}$, and a connective event $v_{i+1}$ that precipitates the transition between the first node and the second node. Several different formulas may be used for these cost functions, and the formulas may be applicable in different story webs. A preference may be given to lower cost scores when selecting storylines to execute. All values may be normalized both before and after computation.

$$\text{Skinny-Pipe: \_cost}(s, e) = \frac{mincut(s, e)}{d(\Pi(s, e))}$$

The Skinny-Pipe cost function divides the min-cut from the first node to the second by the length of their path. This prefers longer stories with at least one major bottleneck.

$$\text{Trap-Nodes: } cost(s, e) = \sum_{\forall s \in out(e)} mincut(s, e) \cdot iprank(e)$$

The Trap-Nodes cost function prioritizes story goal nodes with a low average page-rank out (i.e. low connectivity to the rest of the graph) and penalizes nodes with a high inverse pagerank (indicating low value). The Trap-Nodes cost function finds nodes that represent drastically different states from their immediate peers, which would produce highly volatile chains of events that would cause major changes in the world when they execute.

$$\text{Hub-Nodes: } cost(s, e) = \left( \sum_{\forall s \in out(e)} mincut(s, e) \cdot prank(e) \right)^{-1}$$

The opposite of trap-nodes, the Hub-Nodes cost function prioritizes "popular" nodes that can branch out to a wide array of other nodes, creating more possibilities for new and interesting story trajectories.

No-Return: cost(s,e)=mincut(e,s)−mincut(s,e)

The No-Return cost function finds stories that are difficult to reverse, creating story trajectories along a "point of no return." This indicates transformative world events that modify the world state in drastic, meaningful, and irreversible ways. This value is normalized between 0 and 1, taking negative values into account.

Because these high-level heuristics are still rather simple, they can continue to be combined and weighted for a final story candidate analysis, taking additional factors like story path length into account.

In addition to the story feature heuristics, potential initial story state and terminal story state pairs may be weighted according to their involvement of events matching certain sentiments. When a cost score is computed for a start node and end node, the scoring algorithm may also traverse a storyline from the start-point to the end-point, and may apply a bonus or penalty to the cost function depending on which sentiments appear in the storyline's transitions. In some implementations, the bonus or penalty may be applied by multiplying or dividing the score by some small order of magnitude. Sentiments may include "Negligent", "Brave", "Violent", and "Nonviolent". These may be trivially expanded with additional themes, moods, or other sentiments. For example, a given start-end node pair, the score for a path connecting them may be multiplied by a constant k for every occurrence of a desired sentiment, and divided by k for every occurrence of a sentiment that is not desired.

In addition to the quantitative analysis described above, interactive story development system 100 may use a qualitative analysis to evaluate heuristics in their ability to correctly identify salient stories. Identification may be based on compiled data. For example, one way to compile such data may be to present randomly generated collections of stories using different weighted combinations of these features to human subjects in text form. The human subject may be tasked with reading pairs of stories (generated using different heuristics) and selecting the one that the user found most interesting. From this data collection, a model of the optimal combination of quantitative heuristics that is able to correctly quantify the narrative value of a story may be derived using crowd-sourced data collection.

Storyline generation is dependent on the loaded story web and the narrative value calculations based on sentiment and the cost function evaluation. Story generation may proceed in rounds, where interactive story development system 100 identifies the current story state, and then evaluates potential candidate nodes for the next event. Given the current node s in the story web B=⟨N , A ⟩, the system iterates over potential goal candidate g∈N that optimize the selected cost function cost(s, g) (including sentiment bonuses) to generate a set of maximally divergent candidate goal nodes D. The first event from s that leads to g along the path Π(s, g) for each g∈D is presented to the user as possible events that will lead the narrative down an interesting and divergent path. Algorithm 2 outlines the detail for selecting candidate goal nodes in the story web from the current world state.

---

Algorithm 2:

Data: Number of event suggestions k
Data: Story Web B = (N, A)
Data: Selected cost function cost(s, g)
Data: Current world state node s
Result: Sorted list of candidate events D
D ← ∅;
V ← ∅;
while |D| < k do $g = \underset{g \in N}{\arg\min} \, cost(s, g)$;

$d_{old} = div(D)$;
  $d_{new} = div(D \cup g)$;
  if $d_{new} > d_{old}$ then
    D ← D ∪ g;
  else $D \leftarrow \underset{D' \subset D}{\arg\max} \, div(D')$;

---

Once a candidate is selected from the list by the user, the results of the event execution may be displayed on a display, and the current world state node becomes $n_1$. Interactive story development system 100 may then recalculate goals, and produce or select new candidate nodes. For consistency, and to prevent vacillating goals in continuous stories, interactive story development system 100 may add the goal from the previously selected event candidate as the first goal in a new candidate list S for this round, so long as that goal is still reachable from the new story state. This ensures that the first candidate option is to continue along the path towards the previously selected goal. The process of story generation is to produce lists of candidates, select those candidates (either according to the user's wishes or automatically), wait for the selected event to play out, transition to the new state, and then generate a new set of candidates. There are two storytelling modalities: generative storytelling and intervention storytelling. These two modalities have no bearing on the manner that candidates are selected, but rather represent two different types of interaction with the user in terms of story control.

Generative storytelling may expose the candidate nodes directly to the user at each round and wait for the user to pick the next node from the top choices. During each round, interactive story development system 100 may pause and the user may be presented with a list of the top candidate nodes. In some implementations, the list of top choices presented to a user may include only the top 3 candidate nodes. The number of top nodes presented to the user may be different in different implementations. The list may include which characters and objects may be involved in the candidate nodes. The user may also modify the user criteria (sentiment and cost function) in real-time to generate a new set of candidate nodes. When the user selects a candidate note, the associated interaction executes and eventually terminates, at which point the system may present the user with new candidate nodes. In this modality, the user is wholly responsible for generating the story based on the options available and may pick events on a round-by-round basis.

Intervention storytelling instructs the interactive story development system 100 to automatically select the best candidate, but allows the user to pause the story at any time to change selection criteria or manually select an event as per generative storytelling. When left completely untouched, the automatic storyteller will play out and animate an entire story from start to finish. At any point, and in real time, the user may pause the story and change goal selection criteria, explicitly select the next event from a set of candidates, or both. After the user intervenes, the user may continue to select events one after another, as in generative storytelling, or un-pause the automatic storyteller and allow interactive story development system 100 to continue until the user again decides to intervene. In intervention storytelling mode, the user is charged with selectively shaping the trajectory of the story, but may not necessarily select each successive node in the storyline.

Figure 3:
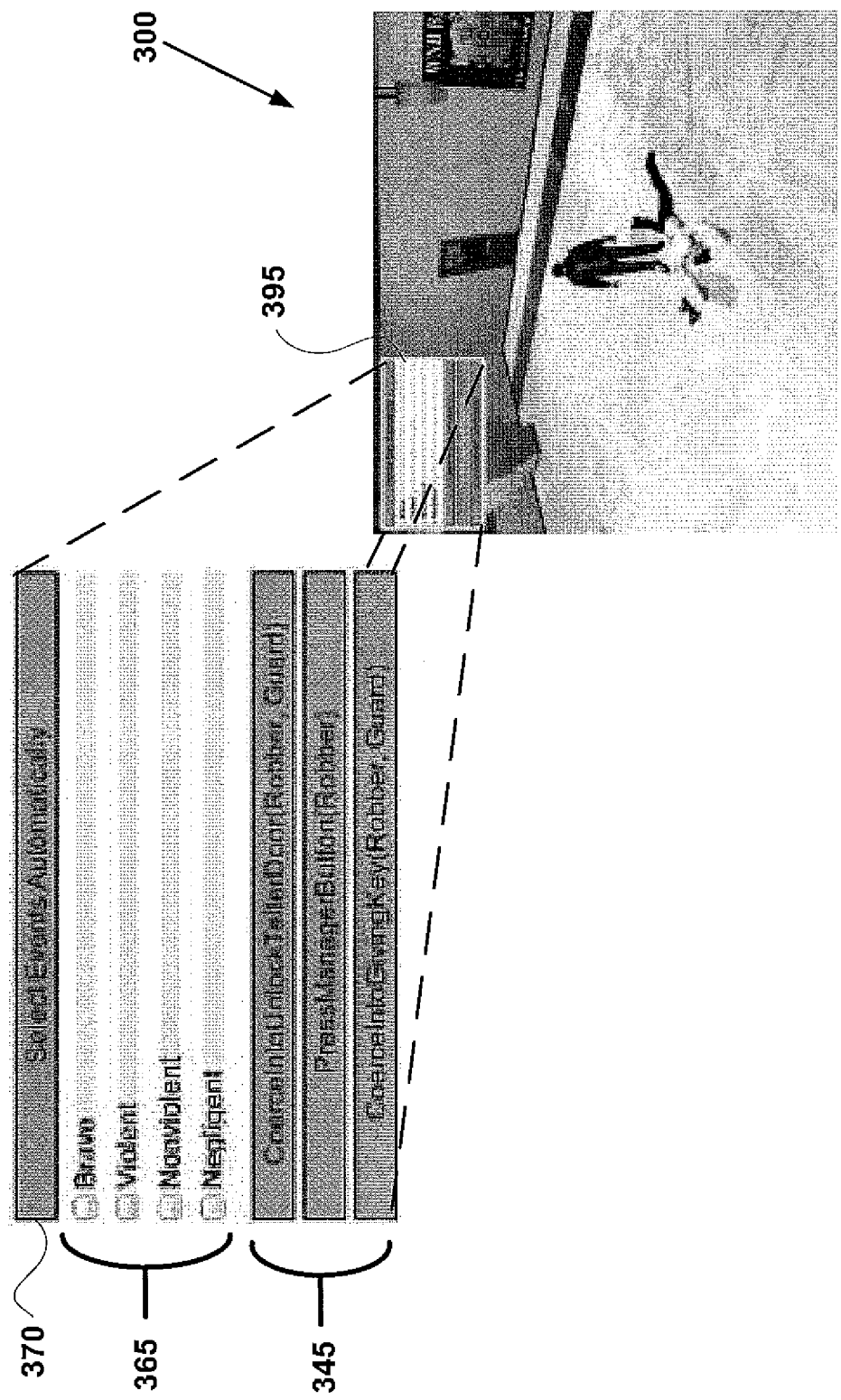
FIG. 3 shows an exemplary screen shot of a developing storyline, according to one implementation of the present disclosure.

FIG. 3 shows an exemplary screen shot of a developing storyline from interactive story device 110, according to one implementation of the present disclosure. Scene 300 includes a scene from a storyline according to the one implementation of the present disclosure. Scene 300 may include user control interface 395, including a plurality of sections for a user to make selections. The selections made by the user in user control interface 395 may include user selected criteria to develop a storyline. The user may select a storytelling mode using storytelling mode selector 370. In some implementations, a user may choose generative storytelling mode by selecting "Pause After Next Event" using storytelling option selector 370. In some implementations, a user may choose intervention storytelling mode by selecting "Select Events Automatically" using storytelling mode selector 370. In some implementations, when a user selects intervention storytelling, and then elects to pause the developing storyline and intervene, interactive story development system 100 may change the storytelling mode to generative storytelling. Additionally, using user control interface 395, a user may select a sentiment using sentiment selector 365, or a candidate node using action selector 345.

Figure 4:
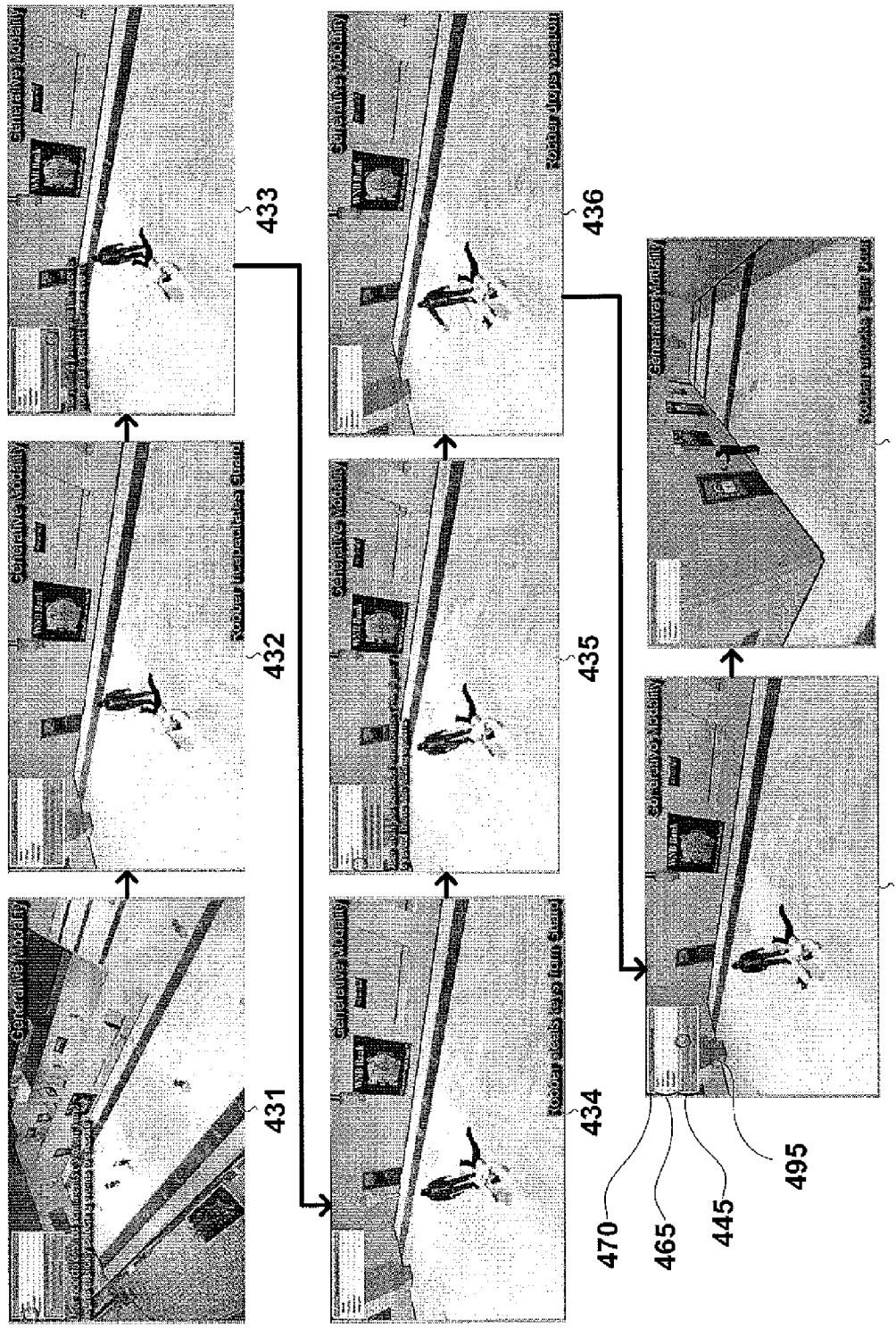
FIG. 4 shows an exemplary flow diagram of a storytelling mode, according to one implementation of the present disclosure.

FIG. 4 shows an exemplary flow diagram of generative storytelling mode, according to one implementation of the present disclosure. At 431, the user selects "violent" as the sentiment using sentiment selector 465. According to the user's selection, at 432 the bank robber incapacitates the bank guard by striking the guard, at which point interactive story development system 100 pauses to wait for input from the user, as shown by 433. At 433, action selector 445 displays a selection of actions to take, where each option corresponds to a candidate node in story web 200. The user selects the option from the candidate nodes presented by action selector 445, instructing the robber to steal keys from the incapacitated guard, which the robber does at 434. Following the completion of the instruction to steal the keys, the story pauses at 435 so the user can make a selection from user control interface 495. At 435, the user changes the sentiment by selecting "negligent" using sentiment selector 465. At 436, the robber negligently drops his weapon. After the robber's negligent action, the story again pauses to wait for input from the user. At 437, the user selects an action from the action selector 445, choosing to have the robber go unlock the bank teller door, as shown at 438. Generative storytelling can carry on in this fashion, pausing after each event to receive input from the user to generate a storyline.

Figure 5:
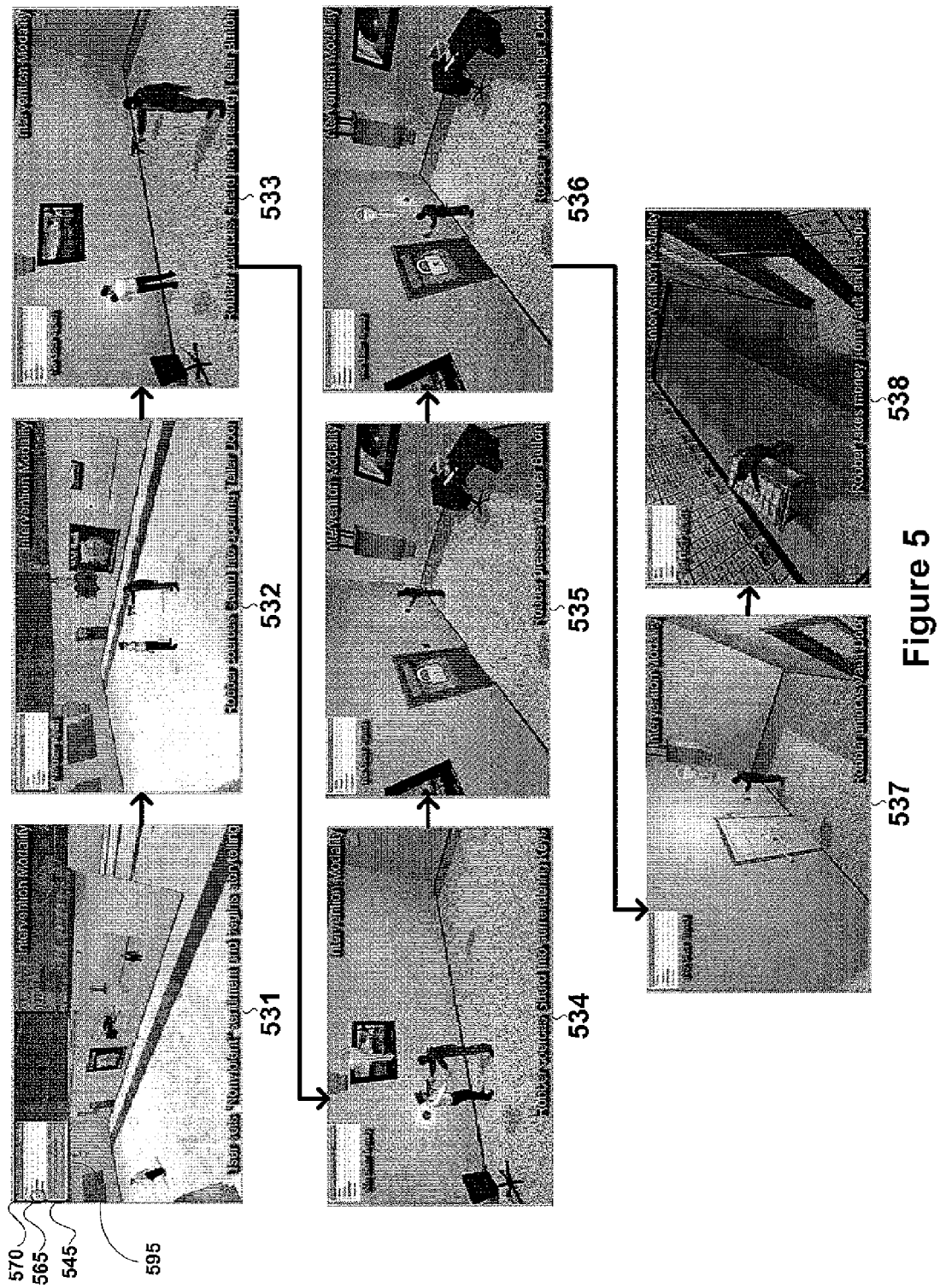
FIG. 5 shows an exemplary flow diagram of a storytelling mode, according to one implementation of the present disclosure.

FIG. 5 shows an exemplary flow diagram of an intervention storytelling mode, according to one implementation of the present disclosure. At 531, the user selects "nonviolent" as the sentiment using sentiment selector 565. At 532, with no intervening input from the user, the robber coerces the guard to open the teller door. At 533, with no intervening input from the user, the robber coerces the guard to press the teller button. The storyline then proceeds to 534, where the robber coerces the guard into surrendering the bank keys. The robber then proceeds to press the manager button at 535, and unlock the manager door at 536, before unlocking the bank vault at 537, and finally stealing the money and escaping at 538. The storyline progresses from 531 to 538 without the user intervening, and each successive step being a nonviolent progression of the storyline.

Figure 6:
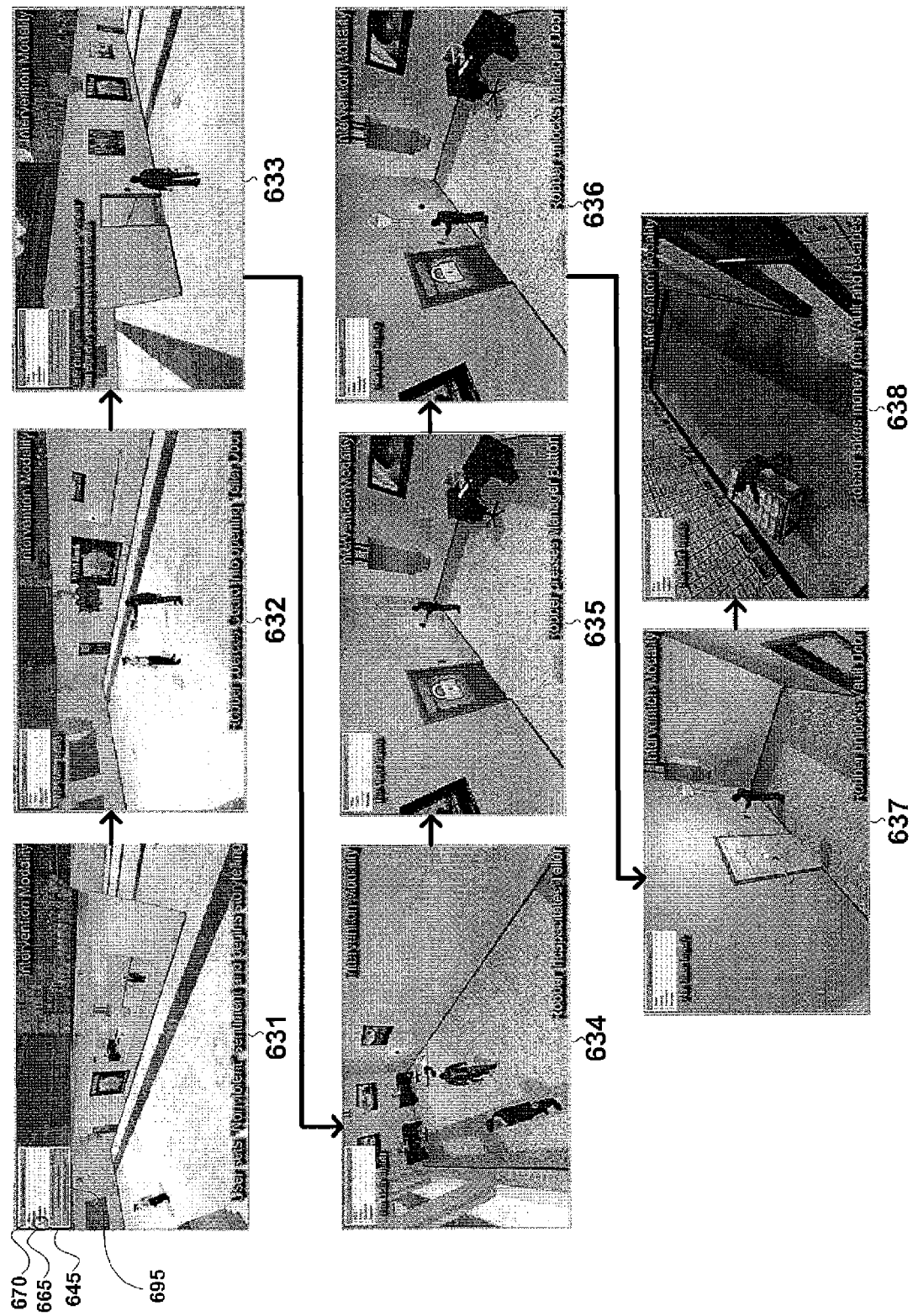
FIG. 6 shows an exemplary flow diagram of a storytelling mode, according to one implementation of the present disclosure.

FIG. 6 shows an exemplary flow diagram of intervention storytelling mode, according to one implementation of the present disclosure. At 631, the user selects "nonviolent" as the sentiment using sentiment selector 665. At 632, with no intervening input from the user, the robber coerces the guard to open the teller door. At 633, the user elects to intervene, and changes the sentiment to "violent" using sentiment selector 665. At 634, the robber violently incapacitates the teller, knocking him unconscious, as indicated by the stars circling his head. The robber then proceeds to press the manager button at 635, and unlock the manager door at 636, before unlocking the bank vault at 637, and finally stealing the money and escaping at 638. The storyline progresses from 631 to 638, pausing only when the user intervened at 633 to change the sentiment selection. Additionally, the story progressed according to the user's sentiment selections.

Figure 7:
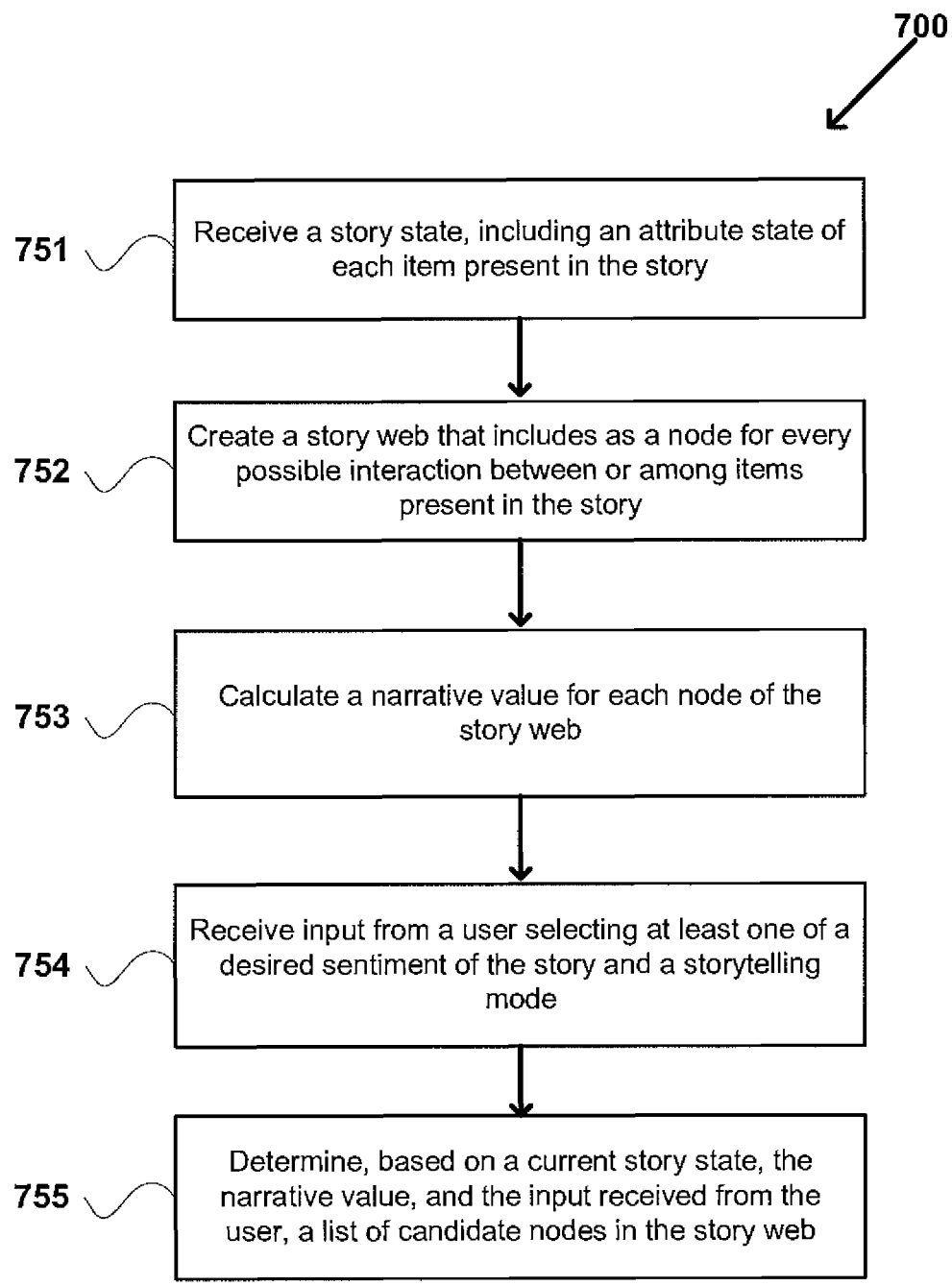
FIG. 7 shows a flowchart illustrating a method for developing a storyline by the interactive narrative development system, according to one implementation of the present disclosure.

FIG. 7 shows a flowchart illustrating a method for developing a storyline using interactive narrative development system 100, according to one implementation of the present disclosure. Initially, at 751, processor 180 of interactive story device 110 may receive a story state, including an attribute state of each item present in a story. As discussed above, items present in a story may include characters of character inventory 131 and objects from object inventory 135, and each character may have a character state corresponding to character attributes 133. Similarly, each object may have an object state corresponding to object attributes 137. The aggregate item states combined create a story state.

At 752, story web 200 is created, including every possible permutation of interactions between or among objects and characters in the story. Each interaction creates a node of story web 200, and each line of story web 200 represents the transitions from the story state of the initial node to the story state of the successive node.

At 753, a narrative value for each node is calculated. As discussed above, the narrative value can include quantitative components and qualitative components. Quantitative components may include a cost of transitioning from one node to another, and may include a factor corresponding to a selected sentiment. Qualitative analysis may include compiled data indicating which storylines or types of storylines are more interesting.

At 754, the system may receive input from a user selecting at least one of a desired sentiment for a storyline and a storytelling mode. The sentiment may be selected from violent, nonviolent, brave, negligent, etc. In some implementations, more than one sentiment may be selected at a time, for example, a user may select nonviolent and brave. The storytelling mode may be either of generative storytelling and intervention storytelling. In some implementations, when a user selects multiple sentiments, the sentiment selected first may be preferred if the selected sentiments would result in different outcomes, for instance, if a user had selected violent and then non-violent, candidate nodes corresponding to violent would be given preference.

At 755, the system may determine, based on the current story state, the narrative value of each node, and the user selected criteria, a list of candidate nodes in story web 200.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An interactive story development system for creating a narrative of a storyline, the system comprising:
    a memory including:
        an inventory including a plurality of items, wherein the plurality of items include a plurality of objects of the storyline and a plurality of characters of the storyline, and
        wherein each item has an attribute state;
        an event library describing a change in the attribute state of each item in the inventory resulting from an interaction with each of the other items in the inventory; and
    a processor configured to:
        receive a story state including an attribute state of each item present in the storyline;
        create a story web, wherein the story web includes a node for every possible interaction between the plurality of objects and the plurality of characters in the storyline;
        calculate a narrative value for each of the nodes of the story web by determining a cost of transitioning from one node of the nodes to each of the other nodes using a cost function, wherein the cost function uses at least one of a pagerank feature, an inverse pagerank feature and a min-cut feature, wherein the pagerank feature is a likelihood of the one node being selected in a random exploration of the story web, wherein the inverse pagerank feature is an unlikelihood of the one node being selected in a random exploration of the story web, and wherein the min-cut feature is a measure of a minimum number of transition lines to be removed from the story web in order to sever all paths from the one node to another node of the nodes;
        receive a first input from a user selecting user criteria including at least one of a story telling option of the storyline and a sentiment selection;
        determine, based on the narrative value and the user criteria, a plurality of candidate nodes of the story web; and
        display, on a display, the storyline generated using the determined plurality of candidate nodes of the story web.

2. The system of claim 1, wherein the story telling option is one of generative storytelling and intervention storytelling, wherein generative storytelling includes the storyline pausing after each event and waiting for an input from the user selecting what action to take next, and intervention storytelling includes the storyline automatically generating a complete story based on the user criteria, wherein the storyline only pauses for input from the user when the user chooses to intervene.

3. The system of claim 1, wherein the sentiment selection includes selecting at least one descriptive tag from violent, non-violent, brave, and negligent.

4. The system of claim 1, wherein the processor is further configured to receive a second input from the user selecting a candidate node from the plurality of candidate nodes.

5. The system of claim 4, wherein the processor is further configured to update the attribute state of each item present in the storyline to reflect the story state at the selected candidate node.

6. The system of claim 1, wherein the memory includes a story web generator.

7. The system of claim 6, wherein the processor is configured to use the story web generator to create the story web.

8. A method for use by an interactive story development system having a memory and a processor, the method comprising:
  receiving, using the processor, a story state including an attribute state of each of a plurality of items present in a storyline, wherein the plurality of items are stored in the memory and include a plurality of objects of the storyline and a plurality of characters of the storyline;
  creating a story web using the processor, wherein the story web includes a node for every possible interaction between the plurality of objects and the plurality of characters in the storyline;
  calculating, using the processor, a narrative value for each of the nodes of the story web by determining a cost of transitioning from one node of the nodes to each of the other nodes using a cost function, wherein the cost function uses at least one of a pagerank feature, an inverse pagerank feature and a min-cut feature, wherein the pagerank feature is a likelihood of the one node being selected in a random exploration of the story web, wherein the inverse pagerank feature is an unlikelihood of the one node being selected in a random exploration of the story web, and wherein the min-cut feature is a measure of a minimum number of transition lines to be removed from the story web in order to sever all paths from the one node to another node of the nodes;
  receiving, using the processor, a first input from a user selecting user criteria including at least one of a story telling option of the storyline and a sentiment selection;
  determining, using the processor, based on the narrative value and the user criteria, a plurality of candidate nodes of the story web; and
  displaying, on a display, the storyline generated using the determined plurality of candidate nodes of the story web.

9. The method of claim 8, wherein the story telling option is one of generative storytelling and intervention storytelling, wherein generative storytelling includes the storyline pausing after each event and waiting for an input from the user selecting what action to take next, and intervention storytelling includes the storyline automatically generating a complete story based on the user criteria, wherein the storyline only pauses for input from the user when the user chooses to intervene.

10. The method of claim 8, wherein the sentiment selection includes selecting at least one descriptive tag from violent, non-violent, brave, and negligent.

11. The method of claim 8, wherein the processor is further configured to receive a second input from the user selecting a candidate node from the plurality of candidate nodes.

12. The method of claim 11, wherein the processor is further configured to update the attribute state of each item present in the storyline to reflect the story state at the selected candidate node.

13. The method of claim 8, wherein the memory includes a story web generator.

14. The method of claim 13, wherein the processor is configured to use the story web generator in creating the story web.

* * * * *